Oct. 12, 1943.  H. G. LEHMANN  2,331,705
COFFEE MAKER
Filed Sept. 6, 1940
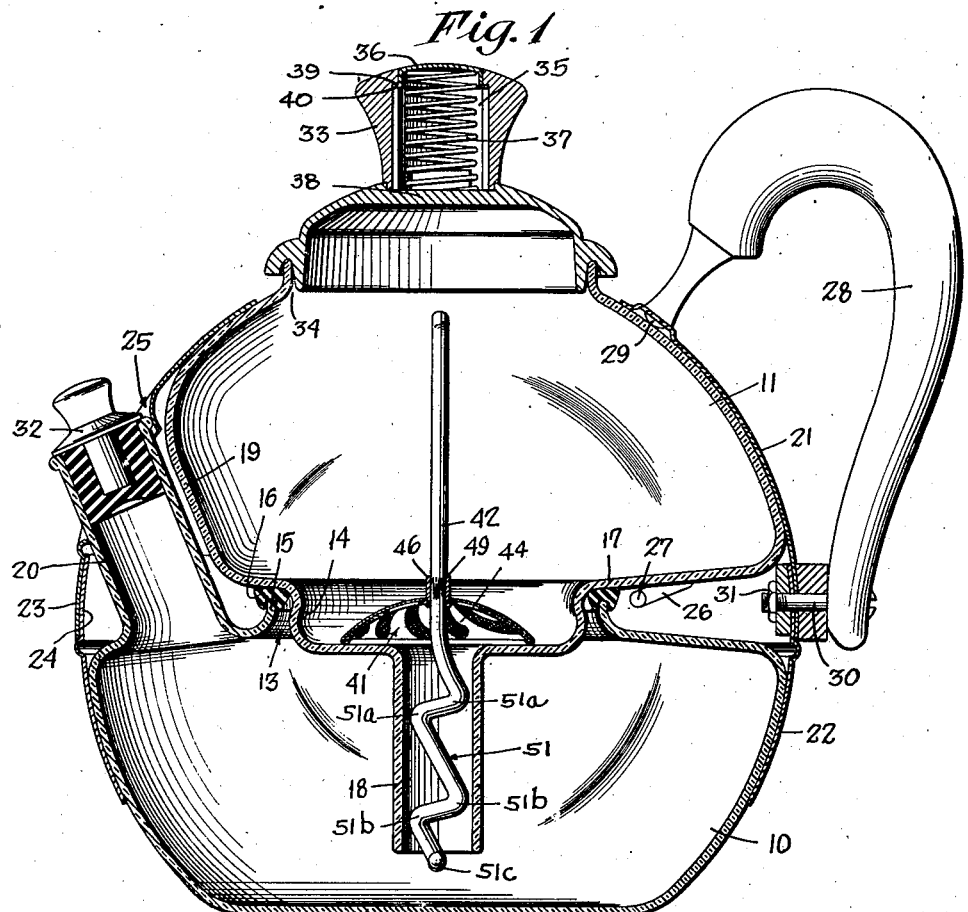
Fig. 1
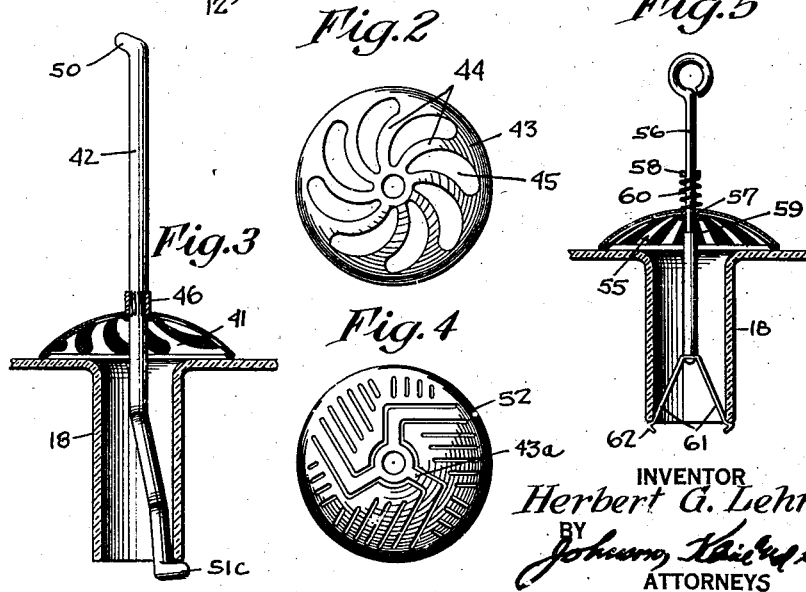
Fig. 2  Fig. 5
Fig. 3  Fig. 4
INVENTOR
Herbert G. Lehmann
BY
ATTORNEYS Registered Oct. 12, 1943

2,331,705

UNITED STATES PATENT OFFICE 2,331,705

COFFEE MAKER

Herbert G. Lehmann, Bridgeport, Conn., assignor to Casco Products Corporation, Bridgeport, Conn., a corporation of Connecticut Application September 6, 1940, Serial No. 355,662

16 Claims. (Cl. 53—3)

This invention relates to coffee making appliances, and, more particularly, to the type disclosed and claimed in my copending application filed August 3, 1940, Serial No. 350,311, of which this application is a continuation in part.

In this type of appliance, water in a closed lower vessel is heated and forced by the pressure formed above the water, due to heating of the same, up through ground coffee in an upper vessel, and then subsequently drawn down through the ground coffee and a filter carried by the upper vessel as a result of a partial vacuum being formed in the lower or water heating vessel upon cooling of the latter. This type of appliance has been termed a vacuum type coffee maker.

Previous coffee makers of this type have generally consisted of a lower or water heating vessel and an upper or coffee steeping vessel superposed thereon, having a hollow stem or tube, extending downward into the lower vessel and providing a communicating passage between the vessels.

To pour the coffee, after the same has been brewed in the majority of the previous proposed coffee makers of this type, it is necessary to remove the upper vessel from its seat on the lower vessel. This necessitated the storage of the upper vessel while the coffee was being served from the lower vessel and the storage of the upper vessel presented many times a perplexing problem.

The appliance of the present invention, as the two vessels are mechanically held together as one, permits coffee to be brewed and served at the dining table without the inconvenience and bother which is now attendant upon the removal and storage of the steeping vessel after the coffee is brewed and before it may be served.

It is necessary to use a filter in the upper vessel to prevent coffee grounds from being drawn down into the lower vessel with the brewed coffee. Generally, it has been proposed to mount a suitable filter over the upper end of the tube of the coffee brewing vessel and hold the same in position over the tube by means of a resilient member depending from the underside of the filter holder down into the tube. The resilient member is provided with a hook which could be disposed over the lower edge of the tube by extending the resilient means and is held in engagement with the lower edge of the tube by the resiliency of the member to which it is attached.

This filter could not be placed in position without first disassembling the two vessels, for it is necessary to grasp an operating link carried by the hook and projecting below the end of the tube to extend the resilient means to permit the hook to engage the lower edge of the tube.

In the appliance of the present invention, as the two vessels need not be disassembled to serve the coffee, a filter holder has been provided which may be quickly and easily mounted in position over the upper end of the tube without disassembling the two vessels.

In the one form of the present invention herein shown, a stem or rod is mounted to a dome-shaped filter holder by means of a plurality of resilient fingers lanced from the filter holder and forming an integral part thereof. The stem projects above and below the holder and the upper projecting end forms a convenient handle for the holder while the lower projecting portion is disposed in the tube and extends downward to a point adjacent the lower edge thereof.

The lower end of the stem is formed with a detent or hook which may be moved into locking engagement with the lower edge of the tube by merely grasping the handle and forcing the stem downwardly and sideways relative to the holder itself. The fingers permit the stem to be depressed and the detent or hook moved downwardly and sideways into engagement with the lower edge of the tube and hold the detent or hook in locking engagement with the tube until released therefrom.

The stem, intermediate the holder and lower end thereof, is formed with a plurality of bends, substantially in one plane, forming a series of lateral projections, the upper pair of which forms a fulcrum which engages the wall of the tube when the stem is forced downwardly and sideways to cause the detent or hook to move into engagement with the lower edge of the tube.

To prevent the movement of the detent into engagement with the lower edge from cracking the same, the other bends in the stem form a second pair of lateral projections adjacent the detent at the lower end thereof, which engage the walls of the tube as the detent snaps into engagement with the lower edge thereof, in order to absorb the shock of said engagement which would otherwise tend to fracture the edge of the tube.

The stem in this form of the invention is provided at its lower end, which is disposed in the tube, with a plurality of resilient fingers formed with hooks or detents at their free ends which engage with the lower edge of the tube when the stem is depressed. The spring, as it is compressed by the movement downward of the stem, tends to return the stem to its normal position relative to the holder and causes the detents or hooks of the stem-carried fingers to lockingly engage with the lower edge of the tube.

In both forms of the invention, the filter holder is provided with a wall-engaging portion which is adapted to carry a suitable filtering cloth, so that when the filter is properly mounted over the tube no ground coffee can be drawn down into the lower vessel during the brewing operation.

To facilitate the serving of the brewed coffee, the appliance of the present invention is provided with a pouring spout formed on the lower vessel through which the brewed coffee may be poured. This spout is completely sealed by a suitable stopple during the brewing of the coffee and prevents any egress of air into the lower vessel so that the action of the appliance is in no way impaired.

To prevent the stopple used with the pouring spout from becoming lost after the coffee is brewed, and it is desired to serve the same, the stopple may be conveniently stored in a cap closing an opening in the upper vessel.

Other features and advantages will hereinafter appear.

In the accompanying drawing:

Figure 1 is a vertical sectional view of the coffee maker of the present invention, with the parts in the position they occupy during the brewing operation.

Fig. 2 is a plan view of the filter holder of the present invention.

Fig. 3 is a view, partly in section, showing the filter holder mounted in the tube of the upper vessel.

Fig. 4 is a top plan view of a modified form of the filter holder of the present invention.

Fig. 5 is a view somewhat similar to Fig. 3, but showing a still further modified form of the filter holder of the present invention.

As shown in the accompanying drawing, referring particularly to Fig. 1, the coffee maker of the present invention comprises a lower or water-heating vessel 10, and an upper or steeping vessel 11, both vessels being approximately hemispherical and having their relatively flat sides juxtaposed so that when they are assembled the two vessels form a substantially spherical body.

The bottom of the lower vessel 10 is provided with a flat surface or base 12 by means of which the appliance may be supported upon a suitable surface, and at its upper end the vessel 10 has a relatively wide open mouth 13 adapted to receive a sump portion 14 of the steeping vessel 11. A lip 15 of the mouth 13 supports a gasket 16 of rubber or other suitable material which is engaged by a bottom portion 17 of the steeping vessel 11 and supports the steeping vessel on the lower vessel with the sump 14 extending into the lower vessel. The steeping vessel has the usual downwardly extending tube 18 through which water contained within the bottom vessel 10, when heated, will pass upwardly through ground coffee in the sump 14 and into the steeping vessel 11 when the coffee is brewed.

As shown in Fig. 1, the steeping vessel is suitably shaped as at 19 to provide clearance for an upwardly extending spout 20 communicating with the lower vessel 10, and through which the brewed coffee may be poured.

According to the present invention, the lower vessel 10 and the upper or steeping vessel 11 are held together as a unit and for this purpose any suitable means may be employed. In the now preferred form of the invention, the two vessels are united by a pair of properly shaped casings 21 and 22, overlying and underlying respectively the largest dimensions of the vessels 11 and 10. These casing parts are provided with overlying marginal portions 23 and 24 which are suitably secured together. The upper casing 21 is provided with an aperture 25 through which the pouring spout 20 of the lower vessel extends.

The casing parts 21 and 22 may be secured together by any suitable means, but preferably are secured together by bayonet locks comprising slots 26 formed in the casing part 22 and pins 27 carried by the casing part 21. After the vessels 10 and 11 are superposed, the parts 21 and 22 are placed over and under the vessels so that the pins 27 enter the slots 26, whereupon the lower casing part is turned relative to the upper casing part causing the parts to be drawn together by the inclined walls of the slots.

The appliance of the present invention is preferably provided with a handle to facilitate handling of the appliance, and, as herein shown, the handle 28 is secured at the upper end to casing part 21 by a rivet 29 and at the lower end is secured to the overlapped portions of the casing parts by a screw member 30 which is passed through suitably aligned apertures formed in the overlapped portions of the casing parts and threaded into a nut member 31 carried by the handle adjacent the lower end thereof.

It is necessary to prevent the escape of air and water vapor from the lower vessel 10 as the water is heated because it is the expansion of the air and water vapor above the water level in the lower vessel which forces the water therein to rise in the tube 18 and enter the steeping vessel. To prevent the loss of air and water vapor from the lower vessel 10, the spout 20 is provided with a stopple 32 which is removed when it is desired to pour or serve the brewed coffee.

To prevent the stopple 32 from being misplaced when it is removed from the pouring spout, there is formed in a cap 33 closing an opening or well 34 in the upper vessel 11 of the appliance, illustrated in Fig. 1, a suitable receptacle for receiving the stopple. This receptacle comprises a well 35 normally closed by a flanged disk 36 resiliently held in the position, shown in Fig. 1, by a coil spring 37 seating on the bottom wall 38 of the well. The well is provided with an annular downwardly facing shoulder 39 against which the flange 40 of the disk 36 is held by the spring 37 to limit the upper movement of the disk. The disk 36 may be easily depressed and the stopple 32, when removed from the pouring spout, may be inserted into the well and frictionally held therein against the action of the spring.

To prevent coffee grounds held by the sump 14 from being drawn down through the tube 18 into the lower vessel after the brewing operation, a suitable filter or strainer is used to retain the coffee grounds in the sump.

In the broader aspects of the invention, any suitable filter or strainer may be used, but, in the invention herein disclosed, this is accomplished by providing a filter received in the sump 14 and held over the opening at the upper end of the tube 18.

In the previously proposed coffee makers of this type, various means have been proposed for holding the filter over the opening at the upper end of the tube so that coffee grounds cannot be drawn down into the lower vessel after the coffee has been brewed.

In many of these previous devices, the means employed for properly seating the filter over the tube have been cumbersome and difficult to use, and, consequently, were a source of annoyance to a user of a coffee maker of this type. To obviate this annoyance and to permit a filter to be used which would not necessitate that the two vessels be separated before the filter could be properly mounted in the upper vessel, the present invention in one form thereof provides a filter which comprises a dome-shaped metallic plate 41 about which is preferably fitted a suitable filter cloth or the like.

To permit the filter holder to be conveniently handled, the same is provided with an elongate stem 42 projecting upwardly therefrom to a position adjacent the opening in the upper vessel. The stem may be mounted to the plate 41 in any manner desired, but preferably is yieldably mounted to the plate by means of a resilient spider-like member 43 having a plurality of resilient legs 44 integrally attached to the wall-engaging base of the plate. The spider-like member may be formed in any suitable manner, but, as herein shown, has been formed integrally with the plate by striking from the plate a plurality of slugs forming the slots 45.

A bushing 46, fixed to the stem intermediate the ends thereof, is secured within a central aperture formed in the body of the spider member 43 by some suitable means such as by peening over the lower edge thereof to form a clinching head.

To hold the rod tightly in the bushing, the peripheral surface of the rod engaged by the bore of the bushing may be suitably knurled as at 49. The upper end of the stem is formed with a knob-like handle 50.

The lower portion 51 of the stem which projects below the plate 41 and which is disposed within the tube 18 is formed with a number of bends to provide an upper pair of elbows 51a, and a lower pair of elbows 51b, all of the elbows lying substantially in one plane. The portion 51 terminates in a hook or detent 51c, bent outwardly from the plane of the elbows, and adapted to engage the lower end of the tube 18. The portion of the stem between the sets of elbows is flexed laterally in the same direction as the detent so that the lower elbows 51b engage the wall of the tube 18, when the plate 41 is centrally positioned above said tube, with the upper portion of the stem 42 extending vertically upward from the plate, and the detent 51c engaging the lower end of said tube. This flexure is shown in Fig. 3.

A knob-like handle 50 at the upper end of the stem 42 extends angularly upward from the stem in a direction opposite to that of the detent 51c.

In order to install the filter holder in the tube 18, the lower portion 51 of the stem is first inserted into the tube. Pressure is then applied to the end of the knob 50 in the direction of said knob. Referring to Fig. 3, this causes the legs 44 of the resilient spider to flex yieldingly, those on the left flexing upward, and those on the right, downward. The upper elbows 51a of the stem engage the left wall of the tube 18 and automatically center the plate 41 over the upper end of the said tube, the said elbows acting as a fulcrum and limiting lateral displacement of the filter holder to the left in the said drawing. The downward component of the pressure on the knob 50 flexes the spider 43 to allow the detent 51c to slip under the lower edge of the tube 18. When this occurs, the knob 50 is released and the resilient spider 43 causes the detent to snap into fully engaged position with the end of said tube.

It has been found that the snapping action of the detent and of the stem against the edge of the tube 18 would normally tend to fracture the glass thereof, and in order to prevent this, the lower elbows 51b are provided. First one, then the other of these elbows generally engage the wall of the tube 18, since the lower portion 51 of the stem is generally not accurately centered in the tube. The lower portion of the stem oscillates resiliently a few times until both elbows 51b engage the wall of the tube. This effect absorbs the shock of the snapping action, preventing application of said shock to the edge of the tube 18, and avoiding any tendency to fracture the latter.

As the spider member tends to retain the upper portion of the stem in vertical position, the hook or detent, once caused to engage the lower edge of the tube 18, will be held against disengagement until the stem is again depressed by application of downward pressure to the knob 50 in the same manner as for installation. As the stem is urged upwardly by the resilient spider, the plate 41 will be urged downwardly against the wall of the sump 14 to seat tightly thereon.

The direction of the knob 50 determines the direction of the applied force for installation, and thus indicates to the operator the manner in which he must apply pressure to the handle for installation of the filter holder. Hence, installation thereof is facilitated, requiring a minimum of attention on the part of the operator.

During the brewing of coffee in the coffee maker, the vacuum generated in the lower vessel during the return of the infusion from the upper to the lower vessel exerts a force in a downward direction to the filter which tends to depress the spider 43 resiliently. By suitable construction of the fingers of the spider, the vacuum may be adapted to release the detent 51c from its resilient engagement with the lower end of the tube 18. The packing of the coffee grounds around the filter is generally sufficiently tight to retain the spider in this depressed position, even after the vacuum is released. As a result, after the coffee is brewed and poured, the filter may be removed from the tube 18 merely by moving it sideways and lifting it out.

It will be seen that the filter of the present invention is one than can be conveniently handled in use and one that provides an efficient filter which will prevent any coffee grounds from being drawn into the lower vessel with the brewed coffee.

In the form of the invention shown in Fig. 4, the filter holder comprises a perforated plate 52 from which has been lanced a resilient spider member 43a having a lesser number of feet than the spider member shown in Fig. 1. The filter holder of Fig. 4 is the equivalent of the filter shown in Fig. 1, with the exception that the feet of the spider member in this case are normally disposed beneath the surface of the plate 52 so that any pressure exerted by the coffee on the plate as a result of the vacuum in the lower vessel, will be taken up by the plate rather than the spider member.

The installation of the filter holder of Fig. 4 in the tube 18, is effected in the same manner as that of the filter holder of Fig. 1. However, in this form of the invention, there is no automatic release of the detent by the vacuum during the brewing of coffee.

There is shown in Fig. 5, a further modified form of the filter holder of the present invention. The filter holder shown in this figure comprises a dome-shaped plate 55 about which is preferably fitted a suitable filter cloth or the like. To facilitate handling of the holder, an elongate stem 56 is slidably received by a bushing 57 carried centrally of the plate.

The sliding movement of the stem relative to the plate is limited by a collar 58 carried by the stem above the plate and a shoulder 59 formed on the lower projecting portion of the stem. A coil spring 60, disposed about the stem, seats on the bushing 57 and works against the underneath side of the collar to normally urge the stem 56 upwardly to the limit of movement allowed by the shoulder 59.

The stem carries at its lower end, which is disposed within the tube of the upper vessel, a plurality of spring fingers 61 formed with catch or detent members 62 adapted to engage the lower edge of the tube when the stem is depressed against the action of the spring.

The coil spring 60, as it tends to return the stem to its normal position, will hold the catch or detent members of the spring fingers, once engaged with the lower edge of the tube, in engagement with the same. The stem, being locked down, will cause the spring to hold the plate tightly against the bottom wall of the sump.

The spring fingers, furthermore, so angularly distend from the end of the stem that they cooperate with the lower edge of the tube to retain the stem centrally of the tube and center the plate over the upper end of the tube.

To remove the filter in this form of the invention, it is merely necessary to grasp the handle formed at the upper end of the stem and give it a slight tug to cause the catch or detent members to be cammed inwardly and break their engagement with the lower edge of the tube.

The present invention, as will now be understood, completely obviates the annoyance occasioned through the use of the previously proposed filters, for the filters of the present invention may be mounted in their proper position over the upper end of the tube without the necessity of separating the two vessels and may be removed from the upper vessel when it is desired to clean the coffee maker by merely grasping the handle and breaking the engagement between the detent means and the lower edge of the tube.

Variations and modifications may be made within the scope of this invention and portions of the improvements may be used without others.

I claim:

1. In a vacuum type coffee maker comprising a lower vessel and an upper vessel securely superposed on the lower vessel and having a tube extending into the lower vessel; a filter holder having means for engaging the lower wall of the upper vessel adjacent the tube; a substantially rigid stem; means for yieldably mounting said stem centrally on said holder to project above and below the same, said yieldable mounting means normally holding said stem in an elevated position relative to said holder, the upper projecting portion of said stem forming a handle for said holder, the lower projecting portion being disposed in said tube and extending adjacent the lower end thereof; means disposed at the lower end of said stem for engaging the lower edge of said tube when the stem is depressed by forcing said handle downward against the action of said yieldable mounting means, the yieldable mounting means upon release of said handle locking said last-named means in engagement with the lower edge of the tube and holding the wall-engaging means of the holder tightly against the wall of the upper vessel; and means carried by the lower end of said stem intermediate said tube edge engaging means and said filter holder for centering the lower end of said stem relative to the tube thereby centering said holder over said tube.

2. In a vacuum type coffee maker comprising a lower vessel and an upper vessel, superposed on and fixed to the lower vessel, having a tube extending into the lower vessel; a filter holder having means for engaging the lower wall of the upper vessel adjacent the tube; a substantially rigid stem; means for yieldably mounting said stem centrally on said holder to project above and below the same, said yieldable mounting means normally holding said stem in an elevated position relative to said holder, the upper projecting portion of said stem forming a handle for said holder, the lower projecting portion being disposed in said tube and extending adjacent the lower end thereof, said mounting means normally holding said stem in an elevated position but permitting said stem to be moved downwardly relative to said wall-engaging means; means disposed on the lower end of said stem for lockingly engaging with the lower edge of said tube when the stem is moved downwardly by depressing the handle and then releasing the same, the yieldable mounting means holding the last-named means in locking engagement with the lower edge of the tube and the wall-engaging means of the holder tightly against the wall of the upper vessel; and means carried by the lower end of said stem intermediate said tube edge engaging means and said filter holder for centering the lower end of said stem relative to the tube thereby centering said holder over said tube.

3. In a vacuum type coffee maker comprising a lower vessel and an upper vessel, superposed on and fixed to the lower vessel, having a tube extending into the lower vessel; a filter holder having means for engaging the lower wall of the upper vessel adjacent the tube; a substantially rigid stem; means for yieldably mounting said stem centrally on said holder to project above and below the same, said yieldable mounting means normally holding said stem in an elevated position relative to said holder, the upper projecting portion of said stem forming a handle for said holder, the lower projecting portion being disposed in said tube; detent means disposed at the lower end of the stem and normally spaced from the lower end of said tube, the mounting means yielding upon a downwardly exerted force against the handle to permit the detent means to be moved downwardly and into engagement with the lower end of said tube to hold the filter holder over the upper end of the same; and means carried by the lower end of said stem intermediate said detent means and said holder for engaging the inner wall of said tube for centering the lower end of said stem relative to the tube thereby centering said holder over said tube.

4. In a vacuum type coffee maker comprising a lower vessel and an upper vessel superposed on the lower vessel and having a tube extending into the lower vessel; a filter holder having means for engaging the lower wall of the upper vessel adjacent the tube; a stem; means for yieldably mounting said stem on said holder to project above and below the same, the upper projecting portion of said stem forming a handle for said holder, the lower projecting portion being disposed in said tube and extending adjacent the lower end thereof, said mounting means normally holding said stem in an elevated position but permitting said stem to be moved downwardly relative to said wall-engaging means; and a plurality of resilient fingers carried by the lower end of said stem, said fingers adapted to lockingly engage with the lower edge of said tube when the stem is moved downwardly by depressing the handle and then releasing the same, the yieldable mounting means holding the fingers in locking engagement with the lower edge of the tube and the wall-engaging means of the holder tightly against the wall of the upper vessel.

5. In a vacuum type coffee maker comprising a lower vessel and an upper vessel superposed on the lower vessel and having a tube extending into the lower vessel; a filter holder having means for engaging the lower wall of the upper vessel adjacent the tube, said holder comprising a substantially dome-shaped plate having a plurality of resilient fingers integral therewith; a stem mounted to the free ends of said fingers and projecting above and below the holder, the upper projecting portion of said stem forming a handle for said holder, the lower projecting portion being disposed in said tube and extending adjacent the lower end thereof; and means formed on the lower end of said stem for lockingly engaging with the lower edge of said tube when the stem is depressed against the action of said fingers, the resiliency of the fingers holding the last-named means in locking engagement with the lower edge of the tube and the wall-engaging means of the holder tightly against the wall of the upper vessel.

6. In a vacuum type coffee maker comprising a lower vessel and an upper vessel, superposed on and fixed to the lower vessel, having a tube extending into the latter; a filter holder having means for engaging the lower wall of the upper vessel adjacent the tube; a substantially rigid stem; means including a spring for yieldably mounting said stem centrally on said holder to project above and below the same, the upper portion of said stem extending to a point adjacent the top of said upper vessel and forming a handle for said holder engageable through an opening formed in the upper portion of said upper vessel, the lower projecting portion of said stem being disposed in said tube and extending to a point adjacent the lower end thereof; means disposed at the lower end of said stem for engaging the lower edge of said tube when the stem is depressed against the action of said spring by forcing said handle downward, the spring upon release of said handle locking said last-named means in engagement with the lower edge of the tube and holding the wall-engaging means of the holder tightly against the wall of the upper vessel; and means carried by the portion of the stem disposed within said tube for engaging the inner wall of said tube to align the stem with the longitudinal axis of said tube and center the filter holder over the upper end of the tube.

7. In a vacuum type coffee maker comprising a lower vessel and an upper vessel superposed on the lower vessel and having a tube extending into the lower vessel; a filter holder having means for engaging the lower wall of the upper vessel adjacent the tube; a stem; means for slidably mounting said stem in said holder; spring means for holding said stem in a normal position relative to said holder so as to project above and below the same, the portion of said stem extending above said holder forming a handle for the same, the lower projecting portion being disposed in said tube and extending adjacent the lower end thereof; and detent means disposed on the lower end of said stem, the detent means being moved into engagement with the lower edge of the tube when the slidably mounted stem is depressed against the action of the spring means and arranged to center the holder with the tube, said spring means tending to return said stem to its normal position after the stem is released and locking the detent means in engagement with the edge of the tube and holding the wall-engaging means of the filter holder tightly against the wall.

8. In a vacuum type coffee maker comprising a lower vessel and an upper vessel superposed on the lower vessel and having a tube extending into the lower vessel; a filter holder having means for engaging the lower wall of the upper vessel adjacent the tube; a stem; means including resilient means integral with said holder for yieldably mounting said stem centrally on the holder to project above and below the same, the portion of said stem extending above said holder forming a handle for the same, the lower projecting portion being disposed in said tube and extending adjacent the lower end thereof; and detent means formed integrally of the stem at the lower end of the same for engaging the lower edge of said tube when the stem is depressed by forcing said handle downward, the yieldably mounting means upon release of said handle moving said detent means into locking engagement with the lower edge of the tube and holding the wall-engaging means of the holder tightly against the wall of the upper vessel.

9. In a vacuum type coffee maker comprising a lower vessel and an upper vessel superposed on the lower vessel and having a tube extending into the lower vessel; a filter holder having means for engaging the lower wall of the upper vessel adjacent the tube; a stem; means for yieldably mounting said stem on said holder to project above and below the same, the portion of said stem extending above said holder forming a handle and the lower portion of said stem extending downwardly into said tube; detent means extending laterally outward from the lower end of said stem and engaging the lower edge of said tube, said detent means being moved into engagement with the lower edge of the tube when the yieldably mounted handle is depressed, the mounting means yielding resiliently in response to a downward lateral force exerted upon the handle in the direction of the detent to permit the latter to move below the lower end of said tube; and means on the lower portion of said stem adjacent the upper end of the tube for engaging the side walls thereof and acting as a fulcrum during the application of said downward lateral force and centering the filter holder above the end of the tube, the detent engaging the end of the tube upon release of said handle, and the yieldable mounting means locking the detent means in said engagement and holding the wall-engaging means of the filter holder tightly against the wall.

10. In a vacuum coffee maker comprising a lower vessel and an upper vessel superposed on the lower vessel and having a tube extending into the lower vessel; a filter holder having means for engaging the lower wall of the upper vessel adjacent the tube; a stem; means including resilient means formed integral with said filter holder for yieldably mounting said stem on said holder to project above and below the same, the upper projecting portion of said stem forming a handle for said holder, the lower projecting portion being disposed in said tube; and detent means disposed at the lower end of the stem and normally spaced from the lower end of said tube, the resilient means yielding in response to a downwardly exerted force against the handle to permit the detent means to be moved downwardly and into engagement with the lower end of said tube to hold the filter holder over the upper end of the same.

11. In a vacuum type coffee maker comprising a lower vessel and an upper vessel superposed on the lower vessel and having a tube extending into the lower vessel; a filter holder having means for engaging the lower wall of the upper vessel adjacent the tube; a stem; means including means integral with said holder for yieldably mounting said stem on the holder to project above and below the same, the portion of said stem extending above said holder forming a handle for the same, the lower projecting portion being disposed in said tube and extending adjacent the lower end thereof; a detent means projecting laterally outward from the lower end of the stem and engaging the lower end of said tube, the mounting means yielding in response to a downwardly exerted force against the handle to move the detent means into engagement with the lower end of said tube, causing said detent means to snap into engagement with the end of said tube when the handle is released, to hold said detent means in locking engagement with the lower edge of the tube and the wall-engaging means of the holder tightly against the wall of the upper vessel; and a pair of lateral projections on the lower part of the stem, adjacent said detent means for engaging the walls of the tube to absorb the shock of the snapping action upon release of the handle.

12. In a vacuum type coffee maker comprising a lower vessel and an upper vessel superposed on the lower vessel and having a tube extending into the lower vessel; a filter holder having means for engaging the lower wall of the upper vessel adjacent the tube; a stem; means including means integral with said holder for yieldably mounting said stem on the holder to project above and below the same, the portion of said stem extending above said holder forming a handle for the same, and the lower projecting portion being disposed in said tube and extending adjacent the lower end thereof; a knob projecting angularly outward and upward from the upper end of said handle; and detent means projecting laterally outward from the lower end of the stem, in a direction opposite to that of the knob, for engaging the lower end of said tube, the mounting means yielding resiliently in response to a force exerted against the end of the knob in the direction of the latter, to move the detent means downwardly into engagement with the lower end of the tube, locking said detent means into engagement with the lower edge of the tube upon release of said knob, and holding the wall-engaging means of the holder tightly against the wall of the upper vessel.

13. In a vacuum type coffee maker comprising a lower vessel and an upper vessel superposed on the lower vessel and having a tube extending into the lower vessel; a filter holder having means for engaging the lower wall of the upper vessel adjacent the tube; a stem; a resilient spider-like member having its feet integrally formed with said filter holder; means for mounting said stem on said spider to project above and below said filter holder, the upper projecting portion of said stem forming a handle for said holder, the lower projecting portion being disposed in said tube; and detent means disposed at the lower end of the stem and normally spaced from the lower end of said tube, the legs of the spider-like member yielding in response to a downwardly exerted force against the handle to permit the detent means to be moved downwardly and into engagement with the lower end of said tube to hold the filter holder over the upper end of the same.

14. In a vacuum type coffee maker comprising a lower vessel and an upper vessel superposed on the lower vessel and having a tube extending into the lower vessel; a filter holder comprising a perforated plate, the edge of which engages the lower wall of the upper vessel adjacent the tube; a stem; a resilient spider-like member having its feet integrally formed with said filter holder, said spider member being disposed below the level of said plate; means for mounting said stem on said spider to project above and below said filter holder, the upper projecting portion of said stem forming a handle for said holder, and the lower projecting portion being disposed in said tube; and detent means disposed at the lower end of the stem and normally spaced from the lower end of the tube, the spider-like member yielding in response to downwardly exerted force against the handle to move the detent means downwardly into engagement with the lower end of said tube and holding the filter holder over the upper end of the same.

15. In a vacuum type coffee maker comprising a lower vessel and an upper vessel superposed on the lower vessel and having a tube extending into the latter; a filter holder having means for engaging the lower wall of the upper vessel adjacent the tube; a stem; means for yieldably mounting said stem on said holder to project above and below the same, the portion of said stem extending above said holder forming a handle and the lower portion of said stem extending downwardly into said tube; detent means extending laterally outward from the lower end of said stem, the mounting means yielding resiliently in response to a downward lateral force exerted upon the handle in the direction of the detent to permit the latter to move below the end of the tube; and a plurality of lateral projections formed on the lower part of the stem, one of the said projections adjacent the upper end of said tube adapted to engage the wall thereof and act as a fulcrum during movement of the stem resulting from said application of force, whereby said detent moves downward and snaps into engagement with the lower end of said tube upon release of said handle, the lowermost projections successively engaging the wall of said tube upon release of said handle, and absorbing the shock of the detent as it engages the end of the tube.

16. In a vacuum type coffee maker comprising a lower vessel and an upper vessel, superposed on the lower vessel and having a tube extending into the latter; a filter holder having means for engaging the lower wall of the upper vessel adjacent the tube; a stem; means for yieldably mounting said stem on said holder to project above and below the same, the portion of said stem extending above said holder forming a handle and the lower portion of said holder forming a handle and the lower portion of said stem extending downwardly into said tube; detent means extending laterally outward from the lower end of said stem, the mounting means yielding resiliently in response to a downward lateral force exerted upon the handle in the direction of the detent to permit the latter to move below the end of the tube; and a plurality of reverse bends in the lower part of said stem forming a plurality of elbows extending on opposite sides of the longitudinal axis of said stem, the uppermost pair of said elbows engaging the wall tube on opposite sides thereof and centering said filter holder relative to the upper end of said tube, one of said pair of elbows acting as a fulcrum for said stem during its movement resulting from said application of force applied to the handle whereby said detent moves laterally down and snaps into engagement with the lower end of said tube upon release of said handle, the lowermost elbows successively engaging the wall of said tube upon release of said handle and absorbing the shock to the tube as the detent snaps into engagement with the lower end of the tube.

HERBERT G. LEHMANN.